USOO5978480A

United States Patent [19]
Fong et al.

[11] Patent Number: 5,978,480
[45] Date of Patent: Nov. 2, 1999

[54] SYSTEM FOR SCRAMBLING AND DESCRAMBLING VIDEO SIGNALS BY ALTERING SYNCHRONIZATION PATTERNS

[75] Inventors: Ming Fong, Yuen Long; Kin Chi Lo, Tai Kok Tsiu, both of The Hong Kong Special Administrative Region of the People's Republic of China

[73] Assignee: VTECH Communications, Ltd., The Hong Kong Special Administrative Region of the People's Republic of China

[21] Appl. No.: 08/708,038

[22] Filed: Aug. 30, 1996

[51] Int. Cl.$^6$ .................................................. H04N 7/171
[52] U.S. Cl. ................................................. 380/15; 380/10
[58] Field of Search .......................................... 380/10, 15

[56] References Cited

U.S. PATENT DOCUMENTS

| | | | |
|---|---|---|---|
| 4,458,268 | 7/1984 | Ciciora | 358/120 |
| 4,511,919 | 4/1985 | Forgey | 358/120 |
| 4,527,195 | 7/1985 | Cheung | 358/120 |
| 4,594,609 | 6/1986 | Romao et al. | 358/119 |
| 4,695,901 | 9/1987 | Ryan | 380/5 |
| 5,272,751 | 12/1993 | Kajita et al. | 380/17 |
| 5,561,713 | 10/1996 | Suh | 380/10 |
| 5,754,650 | 5/1998 | Katznelson | 380/15 |

*Primary Examiner*—Gail O. Hayes
*Assistant Examiner*—Ho S. Song
*Attorney, Agent, or Firm*—Dick & Harris

[57] ABSTRACT

A system for scrambling and descrambling a composite video signal having content and an associated composite synchronization signal. The system comprises an apparatus for scrambling the composite video signal, an apparatus for recovering the composite video signal and a transmission apparatus for transmitting the scrambled composite video signal between the scrambling apparatus and the recovering apparatus. The apparatus for scrambling the composite video signal including a pseudo vertical synchronization signal generator, a pseudo horizontal synchronization signal generator, a combiner for combining the pseudo vertical and horizontal synchronization signals, and an adder for adding the combined pseudo vertical and horizontal synchronization signals into the composite video signal. The apparatus for recovering the composite video signal from the composite video signal with the added combined pseudo vertical and horizontal synchronization signals includes a locator for locating the associated composite synchronization signal in the composite video signal and a circuit for removing the added combined pseudo vertical and horizontal synchronization signals from the composite video signal.

6 Claims, 5 Drawing Sheets

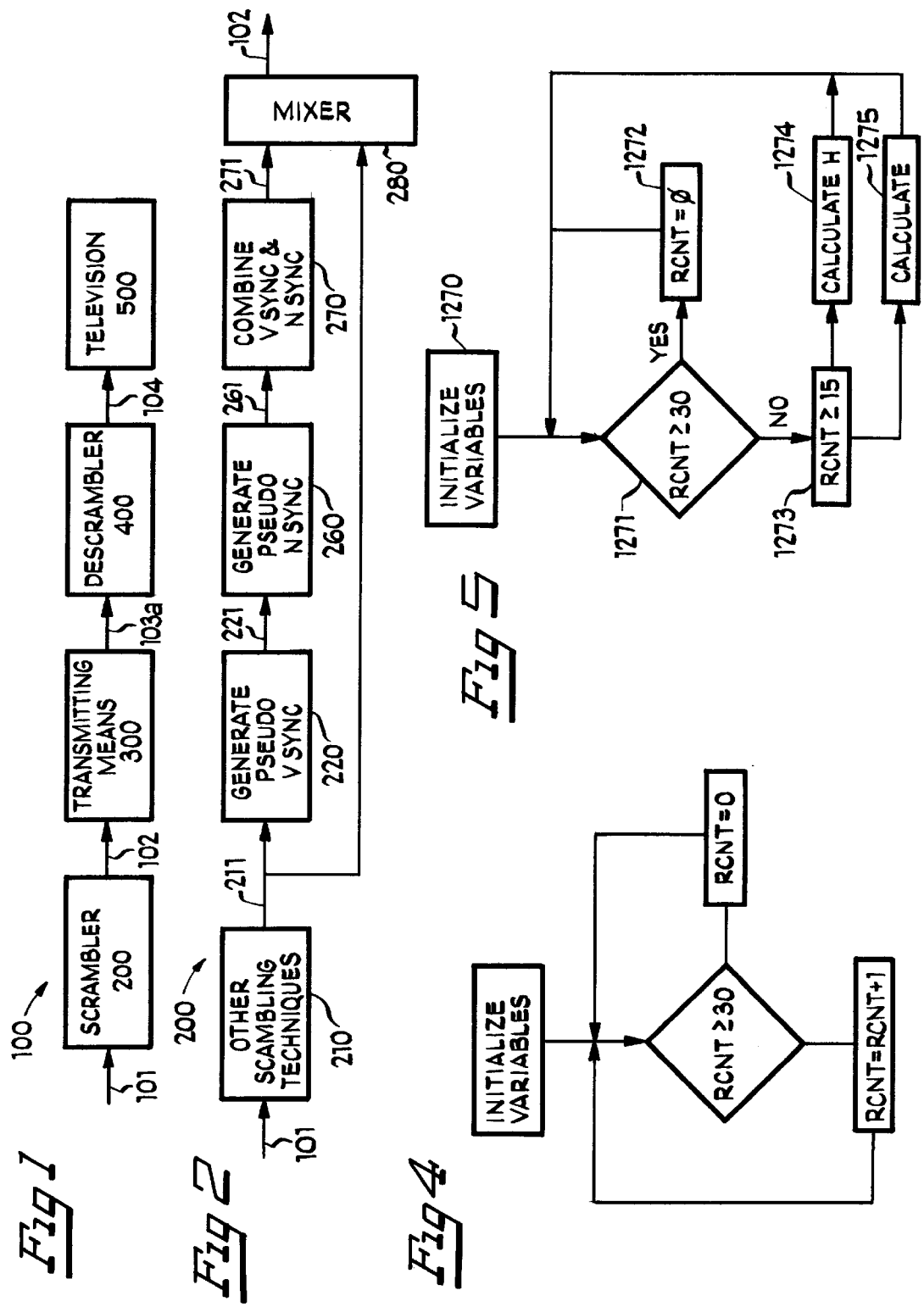

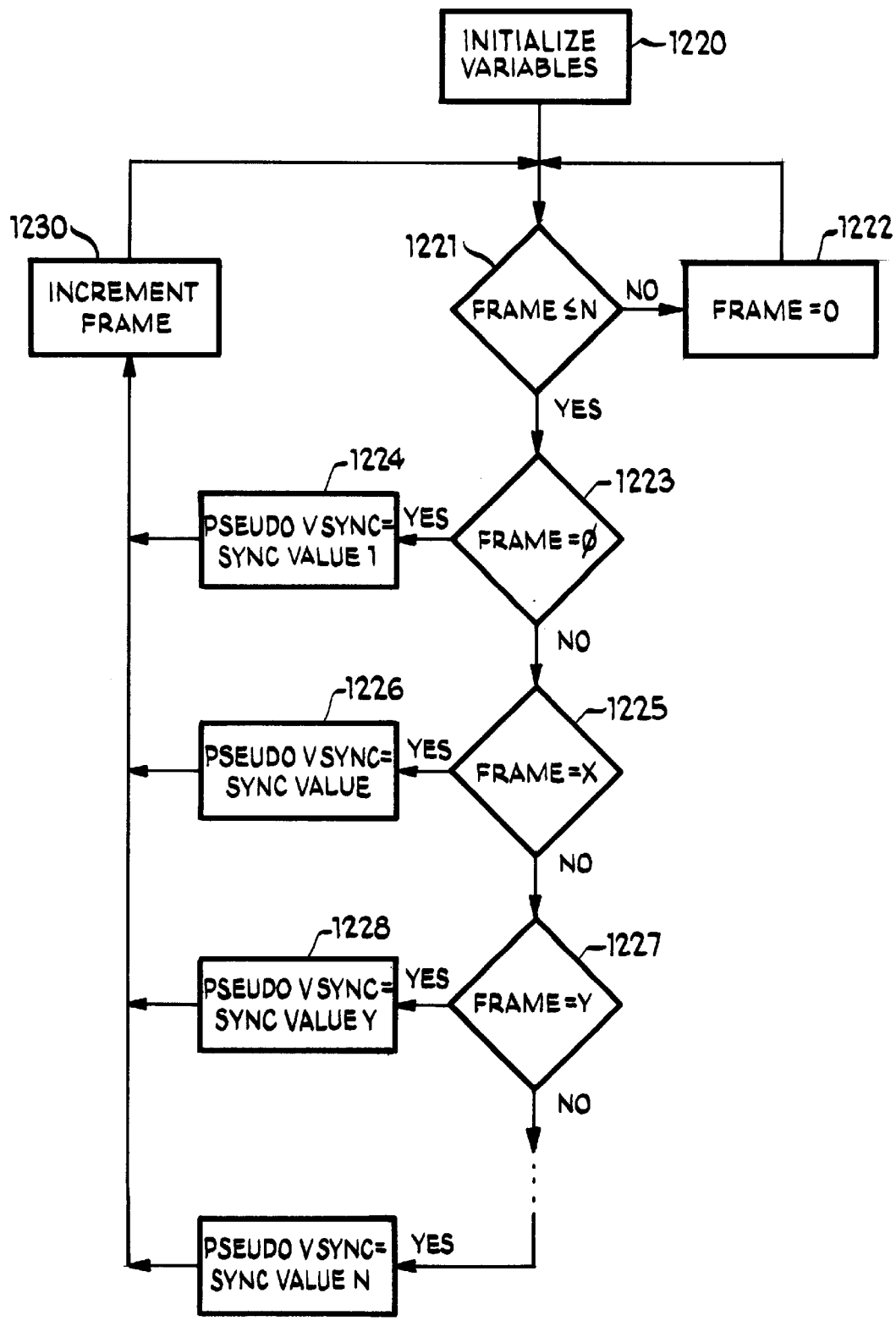

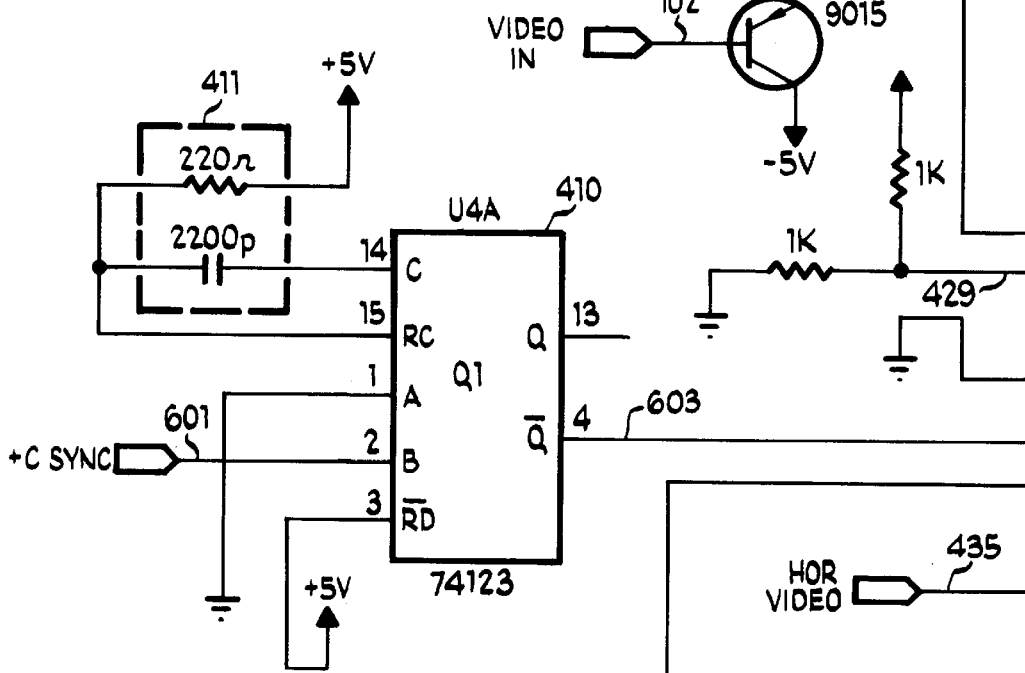

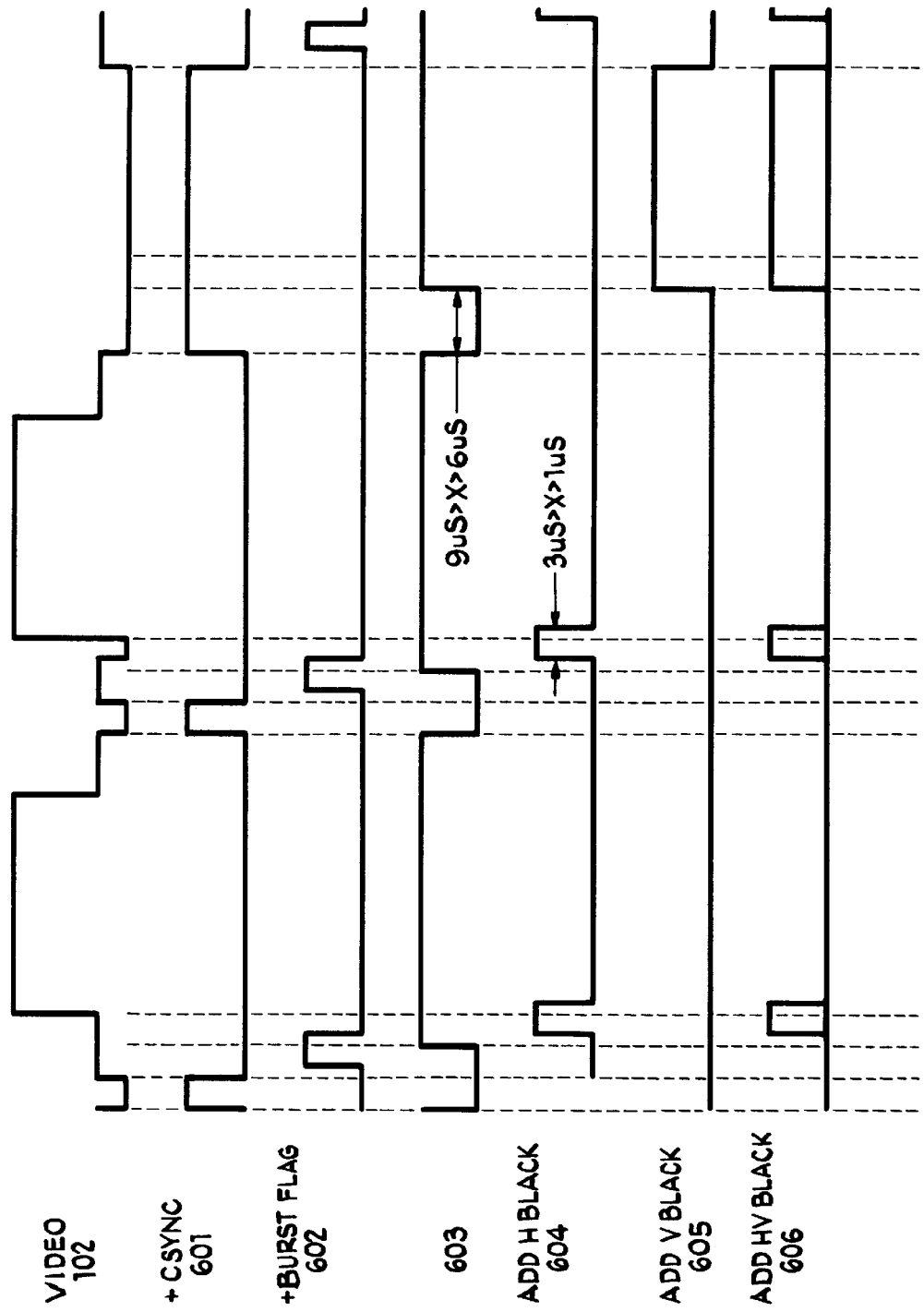

SYSTEM FOR SCRAMBLING AND DESCRAMBLING VIDEO SIGNALS BY ALTERING SYNCHRONIZATION PATTERNS

BACKGROUND OF THE INVENTION

1. Field of the Invention

The present invention relates in general to the transmission of video signals and, in particular, to a system for scrambling and descrambling a composite video signal by altering the synchronization of that composite video signal.

2. Background Art

Systems for delivering numerous channels of television programming directly to consumers on a subscription basis are widespread and include such technologies as cable and direct satellite television. Each television channel broadcast over cable or direct satellite television system includes at least a composite video signal. As known in the art, the video image displayed on the cathode ray tube (CRT) of the television is in fact composed of a series of video images displayed frame by frame wherein the persistence of vision of the human viewer causes the individually displayed frames to be perceived by the viewer as a continuous image. Each frame displayed upon the CRT is created by an electron beam which begins by scanning lines upon the screen from left to right. The displayed image is built up by repeatedly scanning horizontal lines beginning at the top and working down to the bottom of the CRT in what is termed a raster pattern. In the United States televisions conforming to the NTSC standard operate by moving the beam from left to right at 15,750 lines per second and top to bottom at 60 lines per second. Each time the beam reaches either or both of the far borders (right or bottom) of the raster it must flyback to the respective one of the near borders (left or top) so the next trace of the screen can begin. During this flyback (or "retrace", as it is sometimes called) no picture information is sent to the screen which would otherwise over-write the previously scanned lines. Most importantly, the horizontal and vertical movements of the electron beam must be synchronized to insure that each of desired video frames are correctly aligned, scan line to scan line, so that the video image is stable and properly displayed.

To achieve synchronization, the composite video signal contains not only the video signal, but also blanking pulses and synchronizing signals. The blanking pulses cause the video signal amplitude go to the black level so that the retraces in scanning will not be visible. The synchronizing signals, both vertical and horizontal, indicate the time for retracing and are located within the blanking period when no picture information is transmitted.

Many of the cable and direct satellite television systems delivering television programming rely on the ability restrict individual consumer access to all or certain ones of the available channels. Restricted access is achieved by scrambling the signals at a central facility and providing a descrambling apparatus as part of a "set top box" located at each subscriber's location where each set top box is configured to descramble certain ones of the channels depending upon the service paid for by the particular subscriber.

One of the most commonly used methods of scrambling video signals in cable and satellite direct television systems is "sync suppression." By suppressing either or both of the vertical and horizontal synchronizing signals within the composite video signal the various scan lines will normally not be synchronized one to another causing rolling and drift in the picture rendering the image essentially unviewable thus deterring one from watching a television program or channel to which one has not subscribed and paid for. In this technique a "pilot signal" containing the original synchronization system is transmitted apart from the remainder of the composite signal and is used by the descrambler at the user's location to reconstruct the correct composite signal to permit the viewing of a proper video image.

It has been found that certain commercially available television sets are able to substantially synchronize a video signal without the original synchronization information being transmitted therewith. Accordingly, it is an object of the present invention to provide an scrambling apparatus and method for scrambling a video signal such that the video signal will be more difficult to recover without authorization of the cable or satellite television provider.

Another commonly used method of scrambling video signal is "random line inversion." This method reverses the polarity of random individual lines of the video signal. Recovery of the original signal is accomplished by transmitting a code with the scrambled video such that the reversed lines can be restored. This method involves some significant processing overhead as each signal must be demodulated to baseband to recover the code and descramble the video signal. Subsequent remodulation to a particular channel is then also required. As a result, implementation of the random line inversion approach to video scrambling is rather expensive. Moreover, such method of scrambling may not produce a effect upon the video image sufficiently detrimental to discourage all users from watching the scrambled channel.

Consequently, it is another object of the present invention to provide a scrambling technique which conceals the video picture to a degree which discourages unauthorized viewing of a program.

It is an associated object of the present invention to provide an apparatus and method for descrambling a signal scrambled by the apparatus and method disclosed herein.

These and other objects of the present invention will become apparent to those of ordinary skill in the art in light of the present specification, drawings and claims.

SUMMARY OF THE INVENTION

The present invention comprises a system for scrambling and descrambling a composite video signal having content and an associated composite synchronization signal. The system comprises a scrambling apparatus, recovery apparatus and transmitting means that transmits the scrambled composite video signal between the scrambling and recovering apparatuses.

The apparatus for scrambling the composite video signal includes means for generating a pseudo vertical synchronization signal, means for generating a pseudo horizontal synchronization signal, means for combining the pseudo vertical and horizontal synchronization signals, and means for adding the combined pseudo vertical and horizontal synchronization signals into the composite video signal. In a preferred embodiment, the scrambling apparatus further includes means for further scrambling the composite video signal and the recovering apparatus further includes means for unscrambling the further scrambling of the composite video signal. In one embodiment, this further scrambling means performs random line inversion. In another embodiment, the further scrambling means acts upon the composite video signal before the pseudo vertical and horizontal synchronization signal generating means and performs sync suppression on the composite video signal.

The apparatus for recovering the composite video signal from the composite video signal with the added combined pseudo vertical and horizontal synchronization signals includes means for locating the associated composite synchronization signal in the composite video signal, and means for removing the added combined pseudo vertical and horizontal synchronization signals from the composite video signal.

BRIEF DESCRIPTION OF THE DRAWINGS

FIG. 1 of the drawings is a block diagram of the system for scrambling and descrambling a composite video signal;

FIG. 2 of the drawings is a block diagram of the scrambling apparatus used in the system for scrambling and descrambling a composite video signal;

FIG. 3 of the drawings is a flow chart of the preferred method for generating pseudo vertical synchronization (Vsync) signal;

FIG. 4 of the drawings is a flow chart of the preferred method for generating pseudo horizontal synchronization (Hsync) signal;

FIG. 5 of the drawings is a flow chart of the preferred method for combining pseudo Vsync and Hsync into pseudo HVsync;

FIG. 7 of the drawings is a timing diagram of various signals used in recovering true synchronization information in descrambling the scrambled video signal.

DETAILED DESCRIPTION OF THE DRAWINGS

Figure 6B:
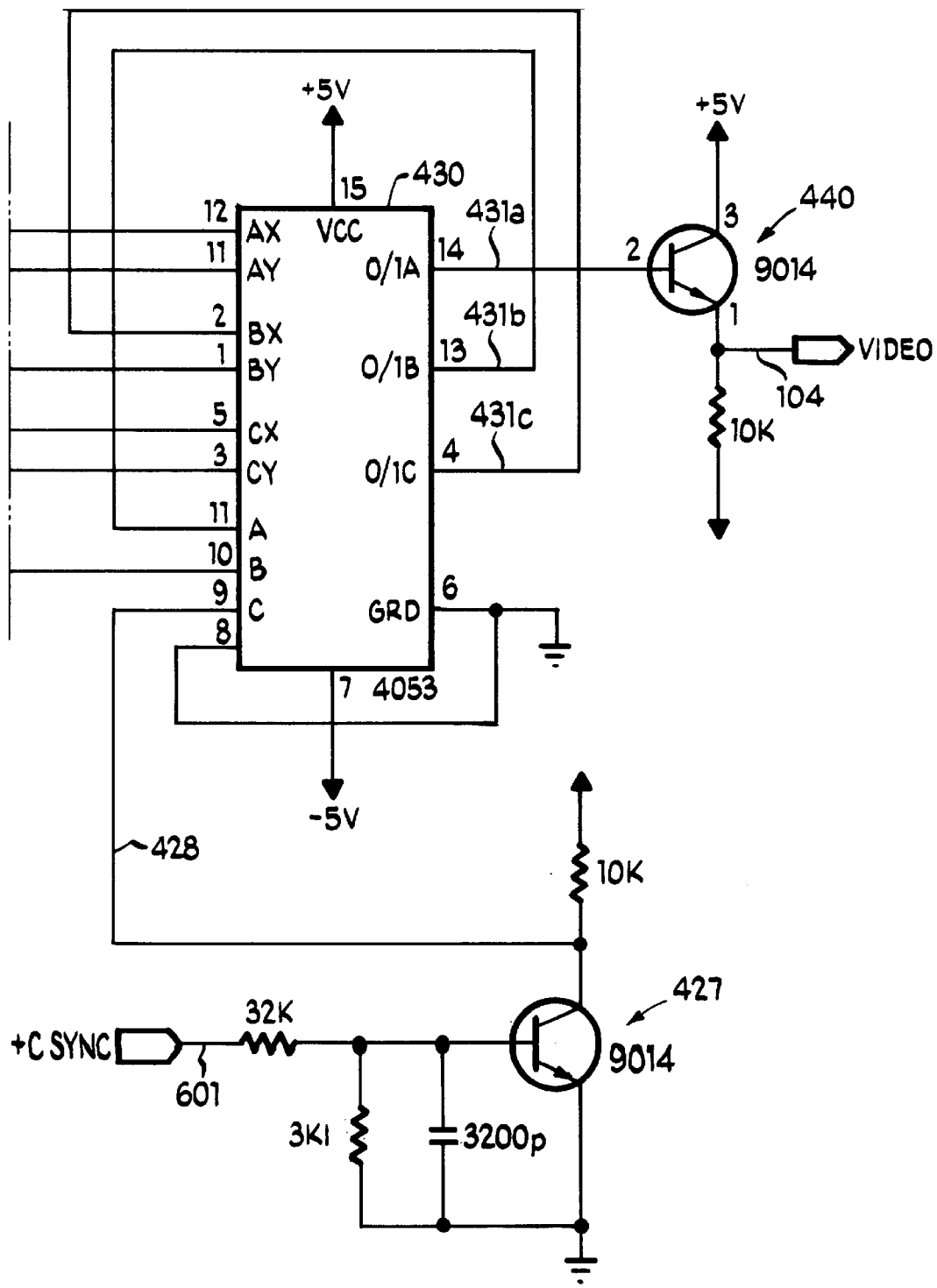
FIG. 6 of the drawings is a schematic diagram of the descrambling apparatus used in the system for scrambling and descrambling a composite video signal.

While this invention is susceptible embodiment in many different forms, there is shown in the drawings and will herein be described in detail, one specific embodiment with the understanding that the present disclosure is to be considered as an exemplification of the principles of the invention and is not intended to limit the invention to the embodiments illustrated.

Although the present system can be used to scramble, transmit and descramble multiple channels of video/audio programming to multiple consumer locations simultaneously, to simplify the present disclosure only one channel as transmitted to one consumer will depicted and discussed with the understanding that the principles disclosed herein apply equally to a multi-channel, multi-user system, as would be understood by one of ordinary skill in the art.

FIG. 1 of the drawings is a block diagram of the present system 100 for scrambling and descrambling a composite video signal. As shown, Composite video signal 101 is fed into scrambler 200 producing scrambled video signal 102. Transmitting means 300 transmits scrambled video signal 102 from a video subscription company to its various subscribers. Transmitting means 300 may be conventional cable television (CATV), direct satellite broadcast television (DSB), or closed-circuit television network (such as found in hotels, hospitals, and other similar institutions), or other systems in which scrambled video signals are utilized. Transmitted scrambled video signal 103 usually received at the consumer's location is fed into descrambler 400. Descrambler 400 produces descrambled composite video signal 104 for each authorized channel and feeds that signal into television 500 for viewing.

FIG. 2 of the drawings is a block diagram of scrambling apparatus 200. Scrambling apparatus 200 accepts composite video signal 101 producing, in turn, scrambled video signal 102. In one embodiment, composite video signal 101 is first scrambled using other previously known scrambling techniques 210, such as "random line inversion," "sync suppression," or a combination of these techniques to provide first stage scrambled video signal 211 upon which further scrambling techniques are performed to provide more complete concealment of composite video signal 101. The pre-scrambling using other scrambling techniques 210 is optional with the overall objects of scrambler 200 (and system 100) being achieved even in the absence of such pre-scrambling. In the preferred embodiment, first stage scrambled video signal 211 is used to calculate pseudo Vsync 221. The preferred method for generating pseudo Vsync 221 is shown in FIG. 3. Step 1220 initializes the FRAME variable to begin the generation of pseudo Vsync 221. Pseudo Vsync 221 is generated on a periodic basis, where the period is N, which is sixteen (16) in a preferred embodiment of the present invention. Steps 1221, 1222 and 1230 control the periodic cycle for the calculation of pseudo Vsync 221. As shown in steps 1223 through 1229, the value generated for pseudo Vsync 221 depends on which frame number in the cycle the present value is being generated for. For purposes of illustration, only frames 0, "X" and "Y" have been shown in FIG. 3. It should be understood that for each and every one of the N-frames in the sequence a particular value for pseudo Vsync 221 will be generated. However, there is no requirement that the value generated for any frame be unique from the value for any other frame. In this light, as shown in FIG. 3, pseudo Vsync 221 for each frame after frame "Y" is generated by step 1229. Step 1230 increments FRAME by one. While the same pseudo Vsync calculation can be utilized for each of steps 1224, 1226, 1228 and 1229, in the preferred embodiment, each of these steps assigns video values from a combination of particular scan lines from the associated video frame. In frames where no pseudo synchronization signal is desired, the variable can be set to an out-of-range line. Table 1 (shown below) is an example of one approach that can be used in a PAL video system. In this programming segment, FRAME 5 is given an out of range assignment, resulting in no pseudo Vsync being added in that frame.

TABLE 1

```
WHEN (FRAME == 0) THEN
    Add_Vsync.D = (Line.Q == 331) # (Line.Q == 619);
ELSE WHEN (FRAME == 1) THEN
    Add_VsyncD = (Line.Q == 19) # (Line.Q == 307);
ELSE WHEN (FRAME == 2) THEN
    Add_Vsync.D = (Line.Q == 22);
ELSE WHEN (FRAME == 3) THEN
    Add_Vsync.D = (Line.Q == 19) # (Line.Q == 307);
ELSE WHEN (FRAME == 4) THEN
    Add_Vsync.D = (Line.Q == 22);
ELSE WHEN (FRAME == 5) THEN
    Add_Vsync.D = (Line.Q == 1023);
ELSE WHEN (FRAME == 6) THEN
    Add_Vsync.D = (Line.Q == 331) # (Line.Q == 619);
ELSE WHEN (FRAME == 7) THEN
    Add_Vsync.D = (Line.Q == 334);
ELSE WHEN (FRAME == 8) THEN
        *         *         *
```

It is also contemplated that pseudo Vsync 221 can be assigned to various constant values rather than variable assignments used in the preferred embodiment. Similarly, combining the use of constant value and variables in generating the pseudo sync for various frames is also contemplated.

FIG. 4 of the drawings is a flow chart of the preferred method for generating pseudo Hsync 261. Table 2 (shown below) is an example of one approach that can be used in a PAL video system with pseudo Hsync 261 represented by the variable Rcnt.

TABLE 2

```
Rcnt.clk       = Csync;
WHEN Rcnt>=30 THEN
   Rcnt:=0;
ELSE
   Rcnt:=Rcnt + 1;
```

The generated pseudo Vsync 221 and pseudo Hsync 261 are combined as shown in FIG. 5 of the drawings. In particular, in step 1270 the RCNT counter, a six-bit wide binary counter (not shown), is reset. The RCNT counter is clocked by the sync signal embedded in composite video signal 101. As shown in FIG. 5, when RCNT is less than of equal to 15, the combined pseudo sync signal is set to:

((Agc & rc2 & Scramble_Period) # (Add_Vsync & T)) in step 1274.

Otherwise, when RCNT is 16 and less than 30 the combined pseudo sync signal is set to:

((Agc & rc3 & Scramble_Period) # (Add_Vsync & T)) in step 1275.

In the foregoing equations:

Agc—the pseudo H-sync timing pulse rc2, rc3—bits of the RCNT counter

Scramble_Period—period of scrambled line in a frame, which is line 28 to 307 and line 314 to 621 for PAL systems and line 28 to line 257 and line 291 to 520 for NTSC systems T—a variable calculated from an internal counter which is synchronized with the live video signal once per line (so any synchronization error will only be accumulated for just 64 microseconds). By mixing Add Vsync and T pulse, a stable and more accurate Pseudo Vsync pulse can be generated.

The resulting combined pseudo sync signal 271 is mixed with first stage scrambled video signal 211 and transmitted via transmitting means 300 as scrambled video signal 102 to descrambler 400.

Descrambling apparatus 400 is schematically shown in FIG. 6 of the drawings and a representative sample of the signals associated therewith are shown in FIG. 7. Descrambler apparatus 400 includes monostable generators 410 and 420, RC circuits 411 and 421, 2-channel analog multiplexers 430*a*, *b* and *c*, composite sync separator (not shown), burst signal generator (not shown) and various other circuit elements that serve to isolate and/or drive various ones of the signals.

Monostable generator 410 is triggered by rising edge of +C_SYNC signal 601, which is extracted by a standard composite sync separator (not shown), generating !Q1 signal 603. The width of !Q1 signal 603 is controlled by the time constant of RC circuit 411, which in a preferred embodiment of the present invention is approximately 6 to 9 microseconds. !Q1 signal 603 is used to detect pseudo Vsync, which has a pulse larger than 4.7 microseconds.

Monostable generator 420 is triggered by the falling edge of +BURST_FLAG signal 602, which is generated by an internal counter 144 nanoseconds after that counter is triggered by +C_SYNC signal 601 with a pulse width of approximately 3.5 microseconds, such that it set to be located at the burst synchronization signal position of each video line, generating Add_Hblack signal 604. Among other things, Add_Hblack signal 604 disables the sync separator circuit (not shown) for a predetermined period of time during which there could be no "true" horizontal sync signal. This predetermined period of time is set by the time constant of RC circuit 421.

As shown in FIG. 6, two-channel analog multiplexers 430*a*, 430*b* and 430*c* can be found within the package, however, this configuration is not required to practice the present invention. Analog multiplexer 430*c* receives !Q1 signal 603 and Add_Hblack signal 604 selection of which is controlled by slow_+C_SYNC signal 428. Slow_+C_SYNC signal 428 is a slower version of +C_SYNC 601, which was required to offset timing considerations introduced through the use of a slower 74HC123 monostable circuit with a 4053 analog switch. Slow_+C_SYNC 428 is generated by introducing delay invertor circuit 427 and, thus, slow_+C_SYNC 428 is the inverse of +C_SYNC signal 601. In the preferred embodiment, this delay approach additionally requires the inputs to analog multiplexer to be flipped, such that if slow_+C_SYNC signal 428 is LOW (+C_SYNC signal 601 is HIGH) then output 431*c* of analog multiplexer 430*c* is !Q1 signal 603 and otherwise it is Add_Hblack signal 604. In other terms, output 431*c* is equivalent to ((+C_SYNC AND !Q1) OR Add_Hblack), which is referred to as the Add_HVblack signal.

Output 431*c* of analog multiplexer 430*c* is fed into analog multiplexer 430*b* along with a ground signal. Multiplexer 430*c* is controlled by HDR_VIDEO signal 435, which enables the pseudo synchronization descrambling, thus, output 431*b* is either GROUND or Add_HVblack signal 431*c*. Output 431*b* controls analog multiplexer 430*a*. When HDR_VIDEO signal is LOW, Analog multiplexer 430*a* actually removes the pseudo sync signals from scrambled video signal 102, by passing scrambled video signal 102 through to output 431*a* when Add_HVblack is LOW and otherwise passing the black level signal 429. In this manner, the pseudo synchronization signal, which would false trigger the synchronization circuitry of television 500, is removed from the video signal. Output 431*a* drives video signal 104 via transistor 440.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

What is claimed is:

1. A system for scrambling and descrambling a composite video signal having content and an associated composite synchronization signal composed of at least a horizontal synchronization signal and a vertical synchronization signal, the system comprising:

an apparatus for scrambling the composite video signal including:

means for generating a pseudo vertical synchronization signal, means for generating a pseudo horizontal synchronization signal, means for combining the pseudo vertical and horizontal synchronization signals, and means for adding the combined pseudo vertical and horizontal synchronization signals on top of the composite video signal thereby producing a scrambled composite video signal;

an apparatus for recovering the composite video signal from the composite video signal with the added combined pseudo vertical and horizontal synchronization signals including:
  means for locating the associated composite synchronization signal in the composite video signal, and
  means for removing the added combined pseudo vertical and horizontal synchronization signals from the composite video signal; and
  means for transmitting the scrambled composite video signal between the scrambling apparatus and the recovering apparatus.

2. The system according to claim 1 wherein the scrambling apparatus further includes means for further scrambling the composite video signal and the recovering apparatus further includes means for unscrambling the further scrambling of the composite video signal.

3. The system according to claim 2 wherein the further scrambling means performs random line inversion.

4. The system according to claim 2 wherein the further scrambling means acts upon the composite video signal before the pseudo vertical and horizontal synchronization signal generating means and performs sync suppression on the composite video signal.

5. An apparatus for scrambling a composite video signal having content and an associated composite synchronization signal composed of at least a horizontal synchronization signal and a vertical synchronization signal, the video scrambling apparatus substantially concealing the composite video signal content, the video scrambling apparatus comprising:

means for generating a pseudo vertical synchronization signal;
  means for generating a pseudo horizontal synchronization signal;
  means for combining the pseudo vertical and horizontal synchronization signals; and
  means for adding the combined pseudo vertical and horizontal synchronization signals on top of the composite video signal thereby producing a scrambled composite video signal.

6. An apparatus for recovering a composite video signal having content, an associated composite synchronization signal composed of at least a horizontal synchronization signal and a vertical synchronization signal and an added pseudo vertical-horizontal synchronization signal, the video recovery apparatus substantially for removing the added pseudo vertical-horizontal synchronization signal, the video recovery apparatus comprising:

means for locating the associated composite synchronization signal in the composite video signal; and
  means for removing the added combined pseudo vertical and horizontal synchronization signals from on top of the composite video signal.

* * * * *